United States Patent
Yu et al.

(10) Patent No.: US 7,522,413 B2
(45) Date of Patent: Apr. 21, 2009

(54) HEAT DISSIPATING SYSTEM

(75) Inventors: Hui Yu, Shenzhen (CN); Mu-Chang Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 57 days.

(21) Appl. No.: 11/842,172

(22) Filed: Aug. 21, 2007

(65) Prior Publication Data
US 2009/0016017 A1 Jan. 15, 2009

(30) Foreign Application Priority Data
Jul. 13, 2007 (CN) .................... 2007 1 0201075

(51) Int. Cl.
*H05K 7/20* (2006.01)

(52) U.S. Cl. ............... 361/687; 345/173; 62/259.2; 165/122

(58) Field of Classification Search ........... 345/156, 345/173, 179; 710/313, 305; 62/259.2, 176.2; 454/184; 165/104.26, 122; 312/223.1–223.4; 428/412; 361/679–687, 724–727
See application file for complete search history.

(56) References Cited

U.S. PATENT DOCUMENTS

| 4,873,395 | A | * | 10/1989 | Mast | ............... 174/382 |
| 2004/0062013 | A1 | * | 4/2004 | Kim et al. | ............... 361/752 |
| 2005/0141189 | A1 | * | 6/2005 | Chen et al. | ............... 361/685 |

* cited by examiner

*Primary Examiner*—Hung V Duong
(74) *Attorney, Agent, or Firm*—Frank R. Niranjan

(57) ABSTRACT

A heat dissipating system comprises a computer enclosure (1), a motherboard (2), at least one dividing panel (271), at least one heat generating element, and at least one heat dissipating device. The computer enclosure has a bottom panel (11). The motherboard is mounted on and substantially parallel to the bottom panel. The at least one dividing panel is perpendicularly attached to the motherboard. The computer enclosure and the at least one dividing panel cooperatively form at least two heat dissipating chambers. The at least one heat generating element is disposed in each of the at least two chambers. The at least one heat dissipating device is disposed in each of the at least two heat dissipating chambers.

9 Claims, 3 Drawing Sheets

HEAT DISSIPATING SYSTEM

BACKGROUND

1. Field of the Invention

The present invention relates to heat dissipating systems, and more particularly to a heat dissipating system divided into several heat dissipating chambers.

2. Description of Related Art

Computer systems have attained widespread use in many segments of today's modern society. Computer systems are typically provided with enclosures, which protect the operating components therein.

Many components of computers generate heat during operation, making it necessary to cool those components so that proper functioning continues, particularly because of the confined space of the enclosure which makes it more difficult for heat dissipate. Cooling strategies for computers usually rely upon forced airflow through the computer enclosure. A typical arrangement provides a heat sink attached on heat generating elements in a computer enclosure and a fan, which induces a flow of air through the heat sink to dissipating heat out of the computer enclosure. However, placement of heat generating elements in a common area allow the heat from the different elements to combine making heat dissipation with the above method more difficult.

What is needed, therefore, is an effective and efficient heat dissipating system for dissipating heat from electronic components therein.

SUMMARY

A heat dissipating system comprises a computer enclosure, a motherboard, at least one dividing panel, at least one heat generating element, and at least one heat dissipating device. The computer enclosure has a bottom panel. The motherboard is mounted on and substantially parallel to the bottom panel. The at least one dividing panel is perpendicularly attached to the motherboard. The computer enclosure and the at least one dividing panel cooperatively form at least two heat dissipating chambers. The at least one heat generating element is disposed in each of the at least two chambers. The at least one heat dissipating device is disposed in each of the at least two heat dissipating chambers.

Other advantages and novel features of the present invention will become more apparent from the following detailed description of preferred embodiment when taken in conjunction with the accompanying drawings, in which:

DETAILED DESCRIPTION

Figure 1:
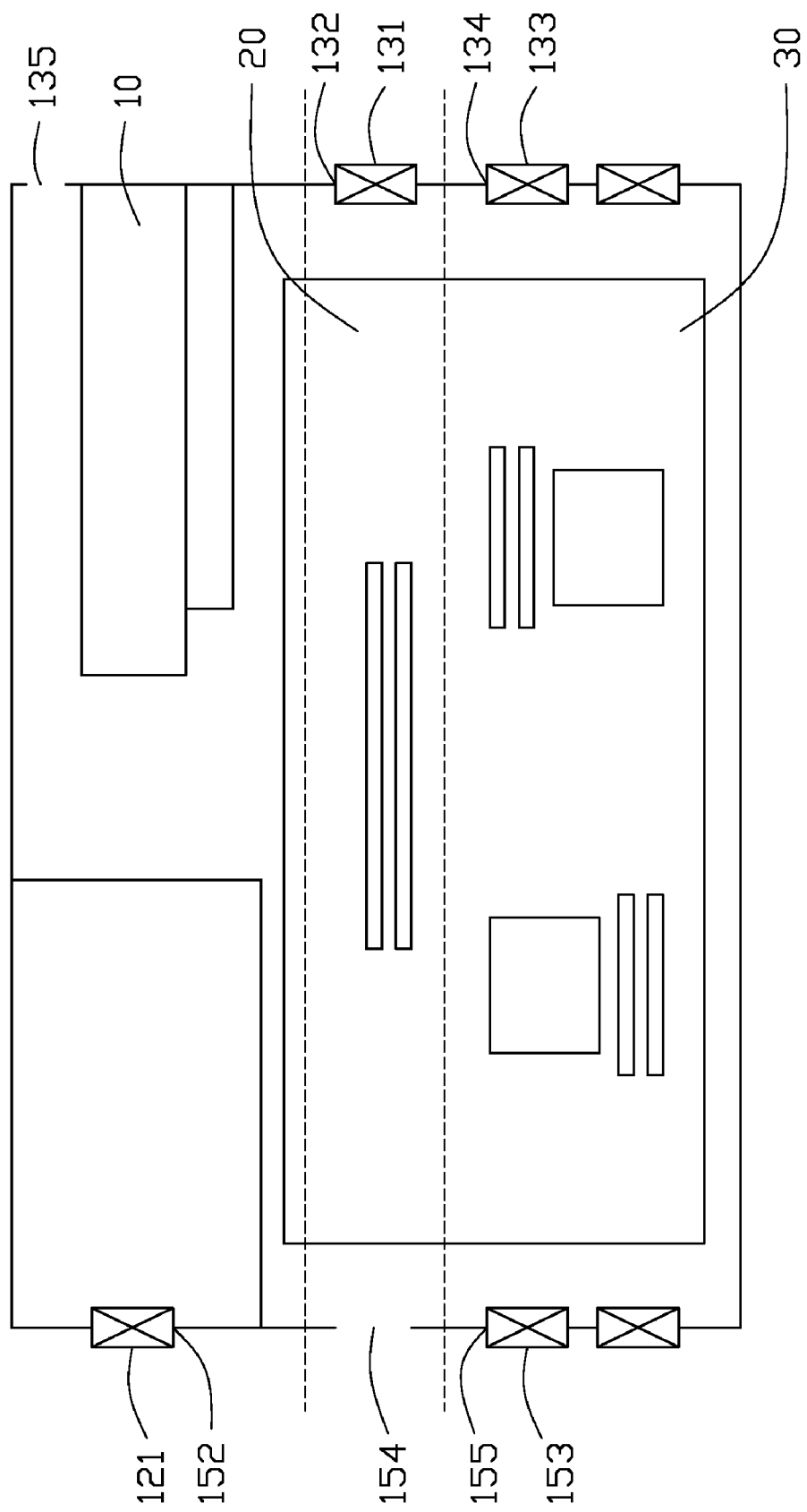
FIG. 1 is a sectional sketch view of a heat dissipation system according to a preferred embodiment of the present invention, the heat dissipation system including three heat dissipating chambers.

Referring to FIG. 1, a heat dissipating system in accordance with an embodiment of the present invention as applied in servers, workstations, and personal computers, is shown.

Figure 2:
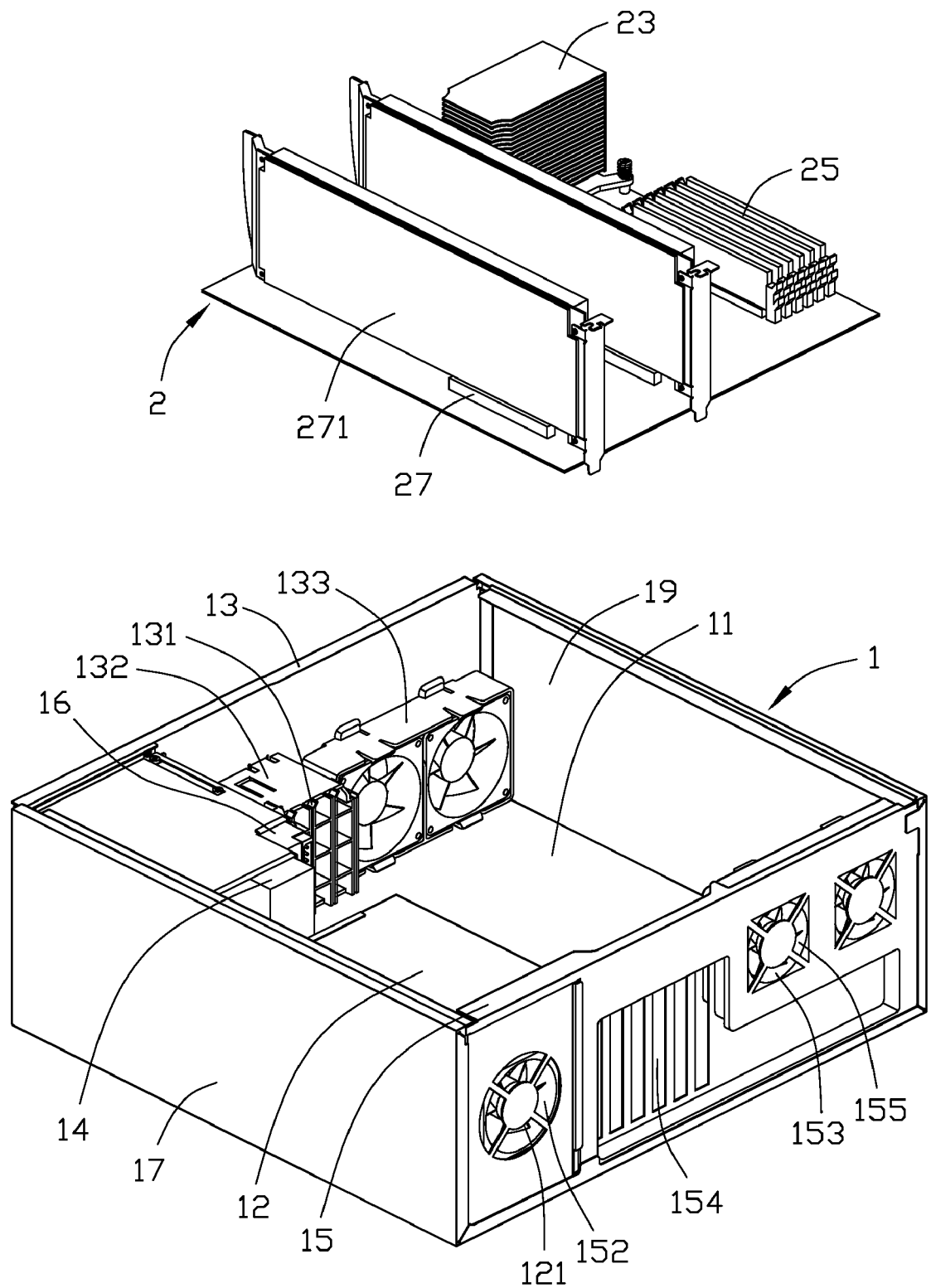
FIG. 2 is an exploded, isometric view of the computer enclosure of FIG. 1.
Figure 3:
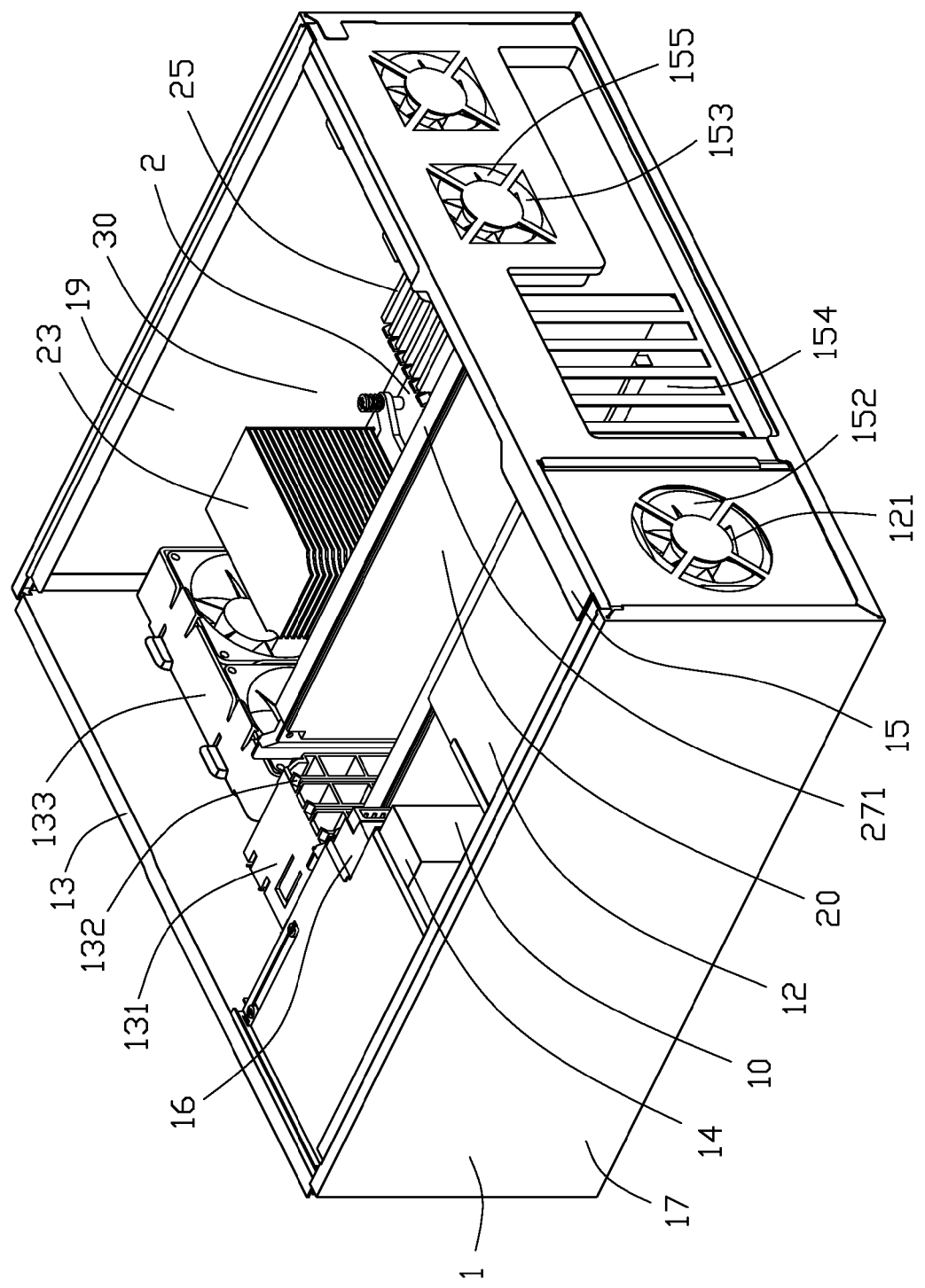
FIG. 3 is an assembled view of FIG. 2.

Referring also to FIGS. 1, 2, and 3, a computer enclosure 1 includes a bottom panel 11, a top cover (not shown), a pair of side panels 17, 19, and a front panel 13 and a rear panel 15 which are both perpendicular to the bottom panel 11. Main components of the computer enclosure 1 include a power supply 12 with a fan 121 therein, an optical disk drive 14, a hard disk 16, and a motherboard 2. Two CPUs and several memory devices are attached to a first end of the motherboard 2. A heat sink 23 is mounted on each CPU. Several PCI slots 27 are attached to an opposite second end of the motherboard 2.

A pair of parallel dividing panels 271 is attached to the computer enclosure 1 to divide the computer enclosure 1 into three heat dissipating chambers 10, 20, and 30. The heat dissipating chamber 20 is formed between the heat dissipating chambers 10, 30. The three heat dissipating chambers 10, 20, 30 respectively include three input vents 135, 132, and 134 formed on the front panel 13. The three heat dissipating chambers 10, 20, and 30 further respectively includes three output vents 152, 154, and 155 formed on the rear panel 15. The heat generating elements in the three heat dissipating chambers 10, 20, and 30 have different heat dissipating need respectively.

Heat generating elements in the heat dissipating chamber 10 mainly include the power supply 12, the optic disk 14, and the hard disk 16. The fan 121 of the power supply 12 is attached on the rear panel 15 in the heat dissipating chamber 10 adjacent to the output vent 152 of the heat dissipating chamber 10. Heat generated by the heat generating elements in the heat dissipating chamber 10 is directed out of the computer enclosure 1 via the corresponding output vent 152.

Heat generating elements in the heat dissipating chamber 20 mainly include several PCI cards inserted in the PCI slots 27 attached on the motherboard 2. A fan module 131 is attached on the front panel 13 near the hard disk 16 adjacent to the input vent 132 of the heat dissipating chamber 20. The fan module 131 includes a securing bracket 132 and a fan secured therein. Heat generated by the heat generating elements in the heat dissipating chamber 20 is directed out of the computer enclosure 1 via the corresponding output vent 154.

Heat generating elements in the heat dissipating chamber 30 mainly include the two CPUs and memory devices 25. A fan module 133 with two fans is attached on the front panel 13 aligned with the CPUs adjacent to the input vent 134 of the heat dissipating chamber 30. Another fan module 153 with two fans is attached on the rear panel 15 adjacent to the corresponding output vent 155 of the heat dissipating chamber 30. Heat produced by the heat generating elements in the heat dissipating chamber 20 is directed out of the computer enclosure 1 via the corresponding output vent 155.

Referring also to FIG. 3, in assembly, the fan modules 131, 133 are secured on the front panel 13 of the computer enclosure 1 aligned with the input vents 132, 134 respectively. The fan module 153 is secured on the rear panel 15 aligned with the corresponding output vent 155. One side of the dividing panel 271 is secured on the rear panel 15 of the computer enclosure 1 and the other side of the dividing panel 271 is secured on one side of the securing bracket 132 of the fan module 131. One side of the other dividing panel 271 is secured on the rear panel 15 of the computer enclosure 1 and the other side of the other dividing panel 271 is secured on the opposite side of the securing bracket 132 of the fan module 131. The heat dissipating chamber 10 is enclosed by the front panel 13, the rear panel 15, the side panel 17, and the dividing panel 271. The heat dissipating chamber 30 is enclosed by the front panel 13, the rear panel 15, the side panel 19, and the dividing panel 271.

A method for configuring a heat dissipating system is provided. The method comprises the steps of: providing a computer enclosure with a plurality of heat generating components contained therein, dividing the computer enclosure into a plurality of heat dissipating chambers according to arrangement of the heat generating components in a manner that each of the heat dissipating chambers has at least one of the heat generating components; disposing at least one heat dissipating device in each of the heat dissipating chambers. The number and/or the output power of the heat dissipating device in each of the heat dissipating device may be determined according to the amount of heat generated by the heat generating components in the corresponding heat dissipating chambers.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipating system, comprising:
    a computer enclosure having a bottom panel;
    a motherboard mounted on and substantially parallel to the bottom panel;
    at least one dividing panel perpendicularly attached to the motherboard, the computer enclosure and the at least one dividing panel cooperatively forming at least two heat dissipating chambers;
    at least one heat generating element disposed in each of the at least two chambers; and
    at least one heat dissipating device disposed in each of the at least two heat dissipating chambers.

2. The heat dissipating system as described in claim 1, wherein the at least one heat generating element includes at least one CPU and at least one memory device attached on the motherboard, the at least one CPU and at least one memory device being arranged in a first one of the at least two heat dissipating chambers.

3. The heat dissipating system as described in claim 2, wherein the at least one heat dissipating device includes at least one printed circuit card attached on the motherboard, the at least one printed circuit card being arranged in a second one of the at least two heat dissipating chambers.

4. The heat dissipating system as described in claim 3, wherein the at least two heat dissipating chambers includes three heat dissipating chambers, and the at least one heat dissipating device includes a power supply and at least one disk drive, the power supply and at least one disk drive being arranged in a third one of heat dissipating chambers.

5. The heat dissipating system as described in claim 1, wherein the computer enclosure includes a rear panel, and each of the at least two heat dissipating chambers has an output vent defined in the rear panel.

6. The heat dissipating system as described in claim 5, wherein one heat dissipating device includes a fan module secured on the rear panel of the computer enclosure, adjacent to at least one output vent of the heat dissipating chambers.

7. The heat dissipating system as described in claim 5, wherein the computer enclosure includes a front panel, and each of the at least two heat dissipating chambers has an input vent defined in the front panel, an airflow passageway formed via each input vent and the corresponding output vent.

8. A heat dissipating system, comprising:
    a computer enclosure having a top panel and bottom panel, a front panel and a rear panel, the front and real panels extending perpendicularly from the bottom panel to the top panel;
    a motherboard mounted on and substantially parallel to the bottom panel;
    a first dividing panel attached to the motherboard, the first dividing panel extending from the mother board to the top wall, the computer enclosure and the dividing panel cooperatively forming two heat dissipating chambers;
    a CPU disposed in a first one of the heat dissipating chambers;
    a printed circuit card disposed in a second one of the heat dissipating chambers;
    a heat dissipating device disposed in each of the heat dissipating chambers.

9. A heat dissipating system, comprising:
    a computer enclosure having a top panel and bottom panel, a front panel and a rear panel, the front and real panels extending perpendicularly from the bottom panel to the top panel;
    a motherboard mounted on and substantially parallel to the bottom panel;
    a first dividing panel attached to the motherboard, the first dividing panel extending from the mother board to the top wall;
    a second dividing panel attached to the motherboard, the second dividing panel extending from the mother board to the top wall, the computer enclosure and the first and second dividing panels cooperatively forming three heat dissipating chambers
    a CPU disposed in a first one of the heat dissipating chambers;
    a printed circuit card disposed in a second one of the heat dissipating chambers;
    a disk drive disposed in a third one of the heat dissipating chambers; and
    a heat dissipating device disposed in each of the heat dissipating chambers.

* * * * *